United States Patent [19]
Wolfendale

[11] Patent Number: 4,572,006
[45] Date of Patent: Feb. 25, 1986

[54] LOAD CELLS

[76] Inventor: Peter C. F. Wolfendale, 33 Pound Hill, Great Brickhill, Milton Keynes, Bucks, MK17 9AS, England

[21] Appl. No.: 506,938

[22] Filed: Jun. 22, 1983

[30] Foreign Application Priority Data

Jun. 22, 1982 [GB] United Kingdom ............... 8217987

[51] Int. Cl.$^4$ .................. G01L 1/14; G01D 3/04
[52] U.S. Cl. .................. 73/862.64; 73/862.63; 177/210 C
[58] Field of Search ............ 73/780, 862.63, 862.64; 177/210 C; 361/283

[56] References Cited

U.S. PATENT DOCUMENTS

| | | | |
|---|---|---|---|
| 2,547,780 | 4/1951 | Reynst | 361/283 |
| 4,237,989 | 12/1980 | Lewis | 73/862.64 X |
| 4,308,929 | 1/1982 | Estavoyer | 177/210 C |

FOREIGN PATENT DOCUMENTS 1909979 9/1969 Fed. Rep. of Germany ...... 361/283

OTHER PUBLICATIONS

T. L. Foldvari et al., "Capacitive Transducers", Instruments & Control Systems, vol. 37, pp. 77–85, Nov. 1964.

Primary Examiner—Charles A. Ruehl
Attorney, Agent, or Firm—Pollock, Vande Sande and Priddy

[57] ABSTRACT

A load measuring transducer comprises a frame structure machined out of a single piece and constituted by an inflexible fixed member and a movable member interconnected by parallel arms and resiliently articulated. The fixed member carries plates of a reference capacitor and one plate of a capacitative transducer, the other plate being carried by the moving member. The fixed and variable capacitors are connected to a ratio measuring circuit whose output signal denotes the applied load independent of environmental conditions. The reference capacitor and capacitative transducer may form portions of a differential capacitor and the electrodes may be planar or cylindrical.

9 Claims, 8 Drawing Figures

$$\frac{C_1}{C_2} = \frac{V_2}{V_1}$$

$$C_1 = \frac{V_2 C_2}{V_1}$$

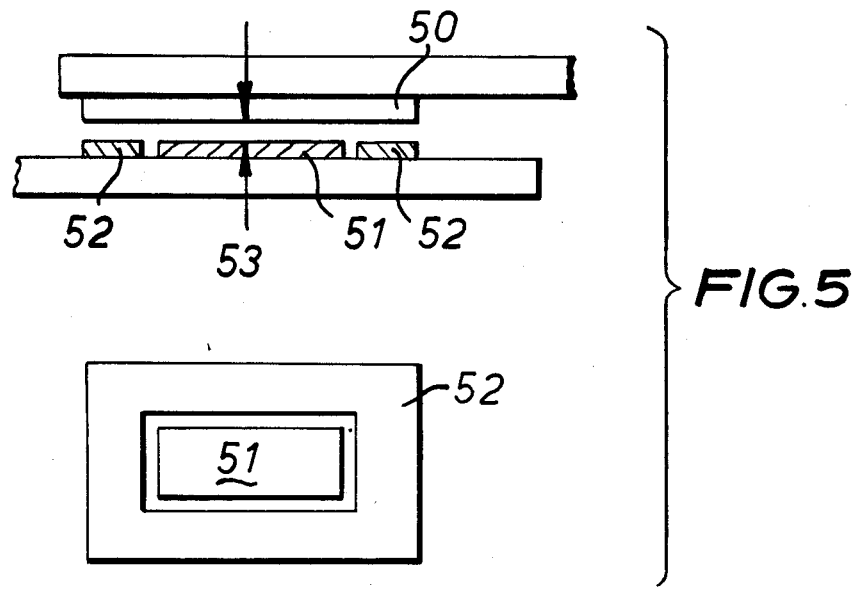
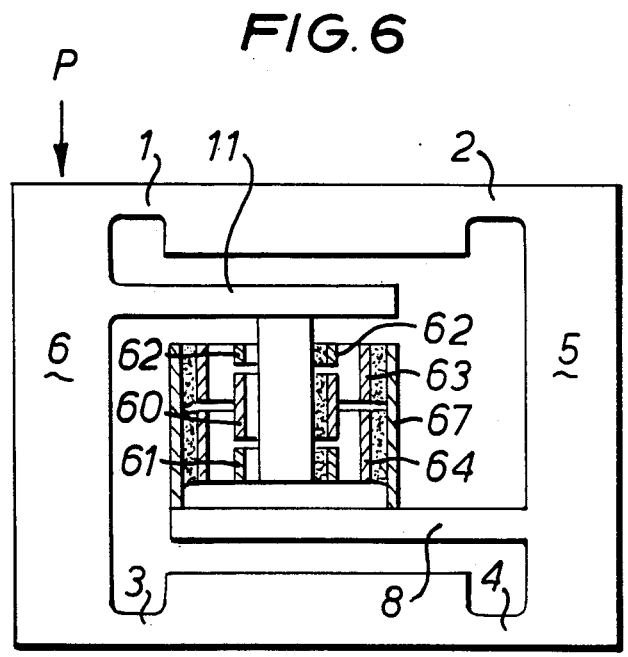

LOAD CELLS

FIELD OF THE INVENTION

This invention relates to a load cell or transducer which is a device for converting force or weight into an electrical signal which can be used to measure or control the said force or weight.

It is well known in the art that a spring system can be made which has a deflection proportional to the force applied. A number of transducers have been made which will measure force by measuring the deflection of a suitable spring. In the present invention it is proposed to use a capacitive displacement transducer as the means of converting the spring deflection into an electrical signal and hence measure the force applied to the spring.

SUMMARY OF THE INVENTION

Broadly stated the invention provides a load measuring device comprising a resilient member and a capacitative displacement transducer so connected to the resilient member that deflection thereof under load results in a signal denoting the applied load, there being at least one other capacitor associated with the resilient member and having the same dielectric medium, a ratio measuring circuit being connected to the capacitative displacement transducer and to said other capacitor and providing a signal denoting applied load.

The invention also provides a load measuring device comprising a deformable frame structure defined by a first inflexible member that is static, a second inflexible member that moves in response to the load and a pair of arms spanning the space between the fixed and moving members and articulated thereto by resilient articulation means, said inflexible members, arms and articulation means being formed in one piece and defining a parallelogram linkage that deforms in response to linear load applied to the fixed member;

a capacitative transducer formed with spaced plates and having a static portion secured to the fixed member and a movable element secured to the moving member;

a reference capacitor defined by spaced plates in the same dielectric medium as the capacitative transducer; and a differential or ratio measuring circuit that is connected to the capacitative transducer and the reference capacitor and gives an output signal denoting the load independent of temperature, humidity and other environmental conditions.

The use of capacitative displacement transducers enables accurate measurements to be made at small deflection, enables relatively stiff resilient elements machined out of solid metal to be used which have high resonant frequencies and so short response times, and gives a reliable response of high sensitivity relatively free from drift.

BRIEF DESCRIPTION OF PREFERRED FEATURES

The ratio measuring circuit may further comprise a temperature sensitive resistance operable to compensate for temperature variation in the spring rate of the resilient member or an element may be interposed between the resilient member and the capacitative displacement transducer whose coefficient of thermal expansion so differs from that of the resilient member to compensate for temperature variation in its spring rate.

The capacitative transducer and the reference capacitor may together constitute a capacitor of the differential kind and its electrodes may be planar with parallel gaps and guard rings. Alternatively, there may be cylindrical inner and outer electrodes one of which is fixed to and movable with the resilient member. A further alternative is for there to be a movable grounded screen between inner and outer cylindrical electrodes. The use of cylindrical capacitors is a considerable advantage because they are relatively insensitive to moisture or oil contamination, dimensional changes or misalignment.

BRIEF DESCRIPTION OF THE DRAWINGS

Various embodiments of the invention will now be described by way of example only with reference to the accompanying drawings, in which:

FIGS. 3, 4, 6, 7 and 7a are views of further embodiments of the transducer; and

FIG. 5 is a view of a planar electrode and guard ring for incorporation into transducers of the aforesaid kind.

DETAILED DESCRIPTION OF PREFERRED EMBODIMENT

Figure 1:
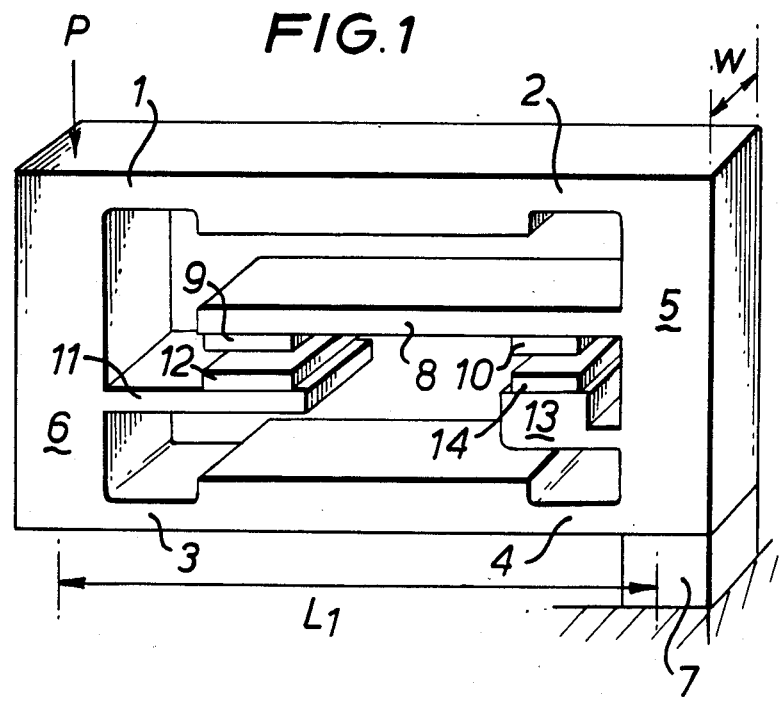
FIG. 1 is a view of a first embodiment of a load measuring transducer according to the invention.

FIG. 1 shows a piece of suitable solid material machined so that two cantilever springs are formed which are firmly attached to each other at either end to form a parallel spring system. The section of the cantilever at regions 1, 2, 3 and 4 is made thinner so that these regions act as hinges connected by more substantial sections 5 and 6 that are not significantly distorted by the applied force so that the whole acts as a parallelogram linkage. If the element 5 is firmly bolted to a base 7 and a load P is applied to element 6, then the element 6 will move until the restoring force due to the spring hinges 1 to 4 equals the applied force. The deflection d of the element 6 will then be a measure of the applied force P.

In order that the deflection can be measured, two capacitors are introduced into the spring system. Element 8 is an extension piece attached to element 5 and carries two electrodes 9 and 10. Element 11 is an extension of element 6 and firmly attached to element 11 is an electrode 12. Element 13 is an extension of element 5 and firmly attached to it is an electrode 14. Electrodes 9 and 12 are adjacent to each other and have a capacitance which is proportional to their area and inversely proportional to their separation. Similarly, electrodes 10 and 14 are adjacent to each other and have a capacitance which is proportional to their area and inversely proportional to their separation.

It is apparent that when a load or a force P is applied to element 6, then the deflection which occurs will alter the gap between electrodes 9 and 12, but that the gap between electrodes 10 and 14 will not be affected. If therefore the ratio between capacitance $C_1$ which is that formed by electrodes 9 and 12 and $C_2$ which is that formed by electrodes 10 and 14 is measured, then this will be an indication of the deflection of element 6 and hence of the load P which is causing that deflection.

Figure 2:
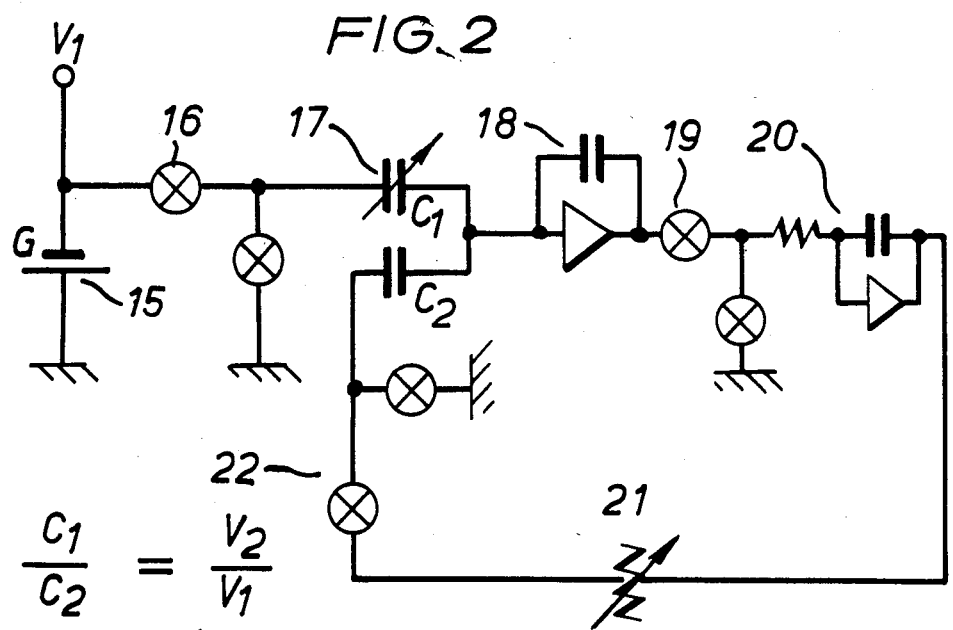
FIG. 2 is a block diagram of a capacitance ratio measurement circuit for use in association with the transducer of FIG. 1.

One of the problems with such a design is that the deflection of the spring is dependent on the modulus of elasticity of the spring material. This is generally temperature dependent, so that the spring rate changes with temperature. There are a number of methods of compensating for this change. One method is to measure the temperature and calculate the change in rate and make a correction to the measured deflection. A second method is to incorporate a temperature sensing element in the spring and use this to modify the output of the ratio measuring circuit. This second method will be described in FIG. 2 which is a block diagram of a typical system for converting capacitance ratio $C_1/C_2$ into a voltage ratio $V_2/V_1$.

Element 15 is a source of DC voltage. This is chopped by a pair of switches 16 to produce a square wave which is applied to a variable capacitor 17, so that an AC current flows into the summing junction of a charge amplifier 18. The output of the charge amplifier 18 is applied to a pair of switches 19 which are driven synchronously with switches 16 so that the original square wave signal is demodified and the resultant DC applied to an integrator 20. The output of the integrator is applied via a temperature dependent attenuator 21 to a third set of switches 22. These switches are also driven synchronously with switches 16 and 19 so that the DC voltage ($V_2$) at the output of integrator 20 is chopped in the same frequency and phase as the DC voltage ($V_1$) applied to $C_1$. There are now two currents flowing into the summing junction of the charge amplifier 18. One current is controlled by the amplitude of $V_1$ and the impedance of $C_1$ and the other current is controlled by the amplitude of $V_2$ and the impedance of $C_2$. When these two currents are equal and opposite there will be zero charge applied to integrator 20 and and the ratio of $V_2$ to $V_1$ will be a measure of the ratio of $C_1$ to $C_2$. If there is a temperature change in a spring material then a resistor which varies with temperature can with advantage be incorporated in the structure of the spring material. In FIG. 1 such a resistor might typically be attached to element 5. It might for example be a thin film resistor mounted on a plastic backing and adhered to the surface of element 5. This temperature dependent resistance element can then be made to form part of attenuator 21 in FIG. 2, so that as a temperature change occurs the slope of a line defining the ratio between the output from integrator 20 and the voltage $V_2$ at the input to charge amplifier 18 is adjusted to compensate for the change in slope of $V_1$ due to the variation in the modulus of elasticity of the spring element in the force transducer, the two such slopes remaining the same and the ratio of $V_2$ to $V_1$ to produce a nul output for a given load remaining unaltered as the temperature changes.

Figure 3:
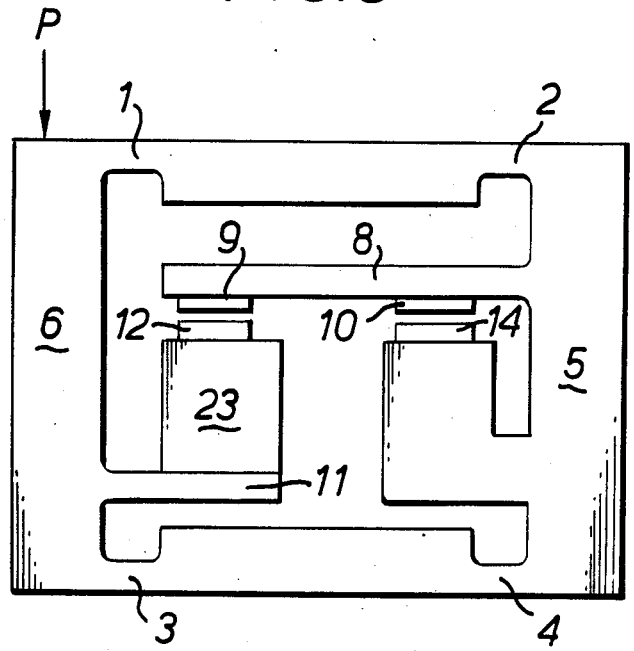

An alternative method of temperature compensation is to incorporate in the transducer circuit a piece of material which has a different coefficient of linear expansion. FIG. 3 shows such an arrangement. In this case an element 23 has been introduced between element 11 and electrode 12 which is of a material having a different coefficient of linear expansion from the material of the spring. It will be seen that with no spring deflection then the capacitors $C_1$ and $C_2$ will have a constant ratio regardless of the temperature, since the effect of linear expansion on the elements of the spring and the two capacitors cancel out since they are identical in all respects, except that one capacitor is controlled by the deflection and the other is not. If a load is applied then one capacitor changes due to the deflection of the spring and the other does not. When the temperature changes then the deflection will change due to the variation of the modulus of elasticity with temperature. Therefore the variation of length with temperature of the element 23 should be such as to oppose the change of spring rate with temperature and thereby provide a means of compensating the transducer system against temperature change.

Figure 4:
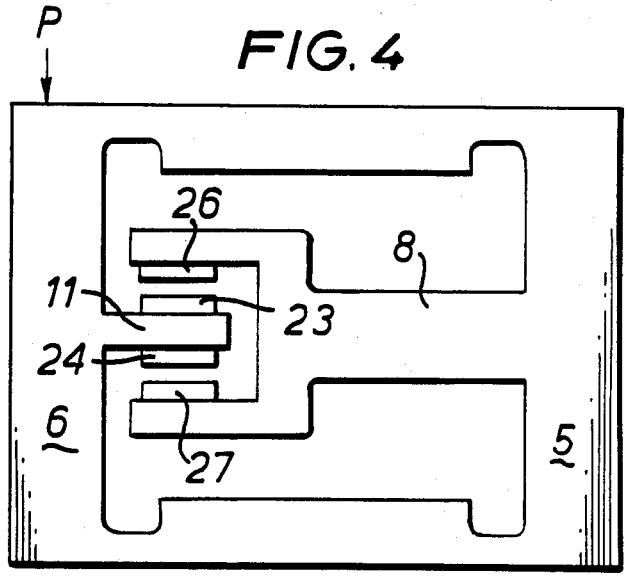

It will be apparent to those skilled in the art that there are other possible arrangements of capacitor systems in a load cell of the present kind. For example in FIG. 4 a differential capacitor arrangement is shown. In this case element 11 has a pair of capacitor electrodes 23, 24 attached to its upper and lower faces which are adjacent to a pair of capacitor electrodes 26 and 27 which are firmly attached to a bifurcated tip of element 8 into which element 11 protrudes. Thus when a load P is applied to element 6 the capacitance between 23 and 26 decreases and that between 24 and 27 increases and the electrodes 23, 24, 26 and 27 act as a differential capacitor.

In a flat plate capacitor system flatness of the capacitative transducer electrodes is important in order to achieve a required linearity of response, and small protuberances, non-parallel gaps and curved or bent surfaces will all produce non-linearities. It is therefore important that the two capacitative transducer electrodes are flat and parallel to a sufficient degree to give the required linearity. A further source of error is an edge effect due to the fringing electrostatic field whereby there may be non-linearities as the gap changes. It may therefore be desirable to make one electrode bigger than the other as shown in FIG. 5. In FIG. 5 element 50 is one capacitor electrode, element 51 is the other and element 52 is a guard ring. The guard ring is made of a sufficient length, so that a change in the gap 53 produces a capacitance change proportional to 1/D with a minimum of edge effects due to the edges of the electrodes 50 and 51.

An alternative to the flat plate design which overcomes the problem of non-linearity due to edge effects of the electrode is to use a cylindrical form of transducer. In FIG. 6 the same spring system is shown as in FIG. 1 but instead of a variable gap transducer using flat electrodes, a variable area transducer using cylindrical electrodes is shown. Element 60 is a cylindrical electrode which is carried on a moving member 11 of the spring system. The moving member 11 also carries guard rings 61 and 62 at either end of the electrode 60 which are normally held at ground potential. This cylindrical electrode assembly is carried on the moving member 11 so that it moves freely and is located inside a fixed electrode consisting of two energized electrodes 63 and 64 that are equally spaced above and below electrode 60 and constitute therewith a differential capacitor. In an alternative construction (not illustrated) electrode 63 could have its entire surface adjacent electrode 60, so that the capacitance between them is constant for small movements of electrode 60. Electrode 64 could overlap the edge of electrode 60 so that the capacitance between them changes linearly with axial movement of electrode 60. Adjacent to electrodes 63 and 64 could be provided guard electrodes which again could serve to minimize the edge effects due to the limited length. These could be held in a housing that supports them and could be used to anchor the fixed part of the spring system to its arm 8. This arrangement would not have such a large capacitance change for unit movement when compared with the variable gap system, but it would possibly be more convenient to manufacture. A yet further possibility is to make both the inner and the outer electrodes fixed and to interpose a moving grounded screen between one of the two capacitors, the said screen being attached to the movable member 6. In that case the member 8 would support outer electrodes 63 and 64 as before and also an inner electrode corresponding to the electrode 60 but extending the full length of the electrodes 63, 64. The moving member 11 would then carry a grounded screen interposed between the inner electrode and the electrode 63. Thereby there would be provided a fixed reference capacitor constituted by the inner electrode and electrode 64 and a capacitative transducer constituted by the inner electrode, the electrode 63 and the grounded screen.

Figure 7:
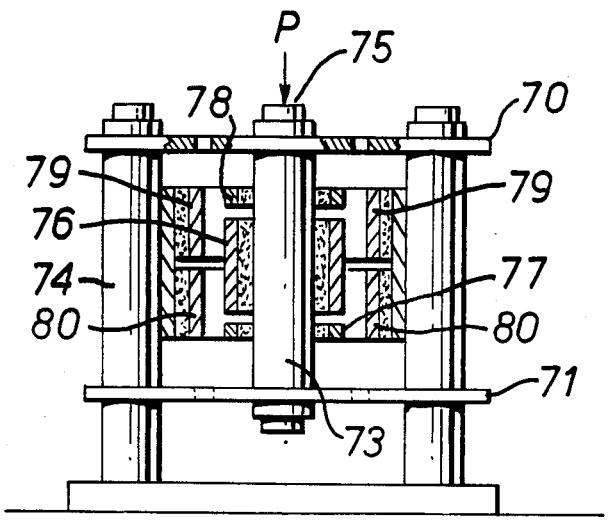
Figure 7A:
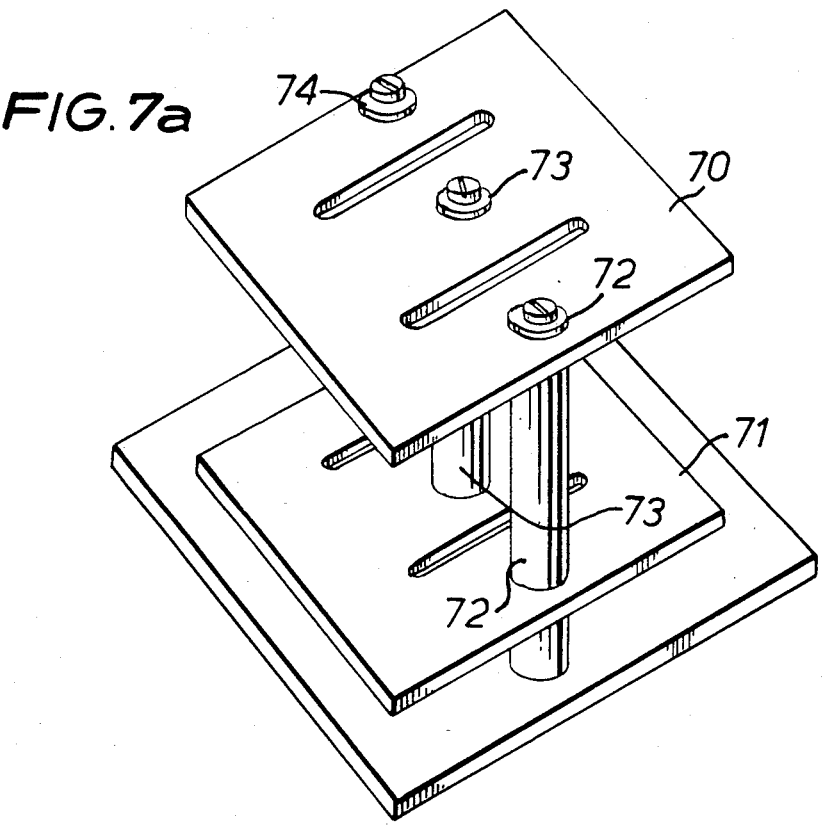

In the foregoing discussion the reference has been to a particular type of spring system. It will be appreciated that there are other forms which this spring may take. By way of an example an alternative configuration of a load cell using a capacitative transducer as the sensor is shown in FIG. 7. In this case two flat spring elements 70 and 71 are made from sheet material in such a way that they form double cantilever springs. These two springs are bolted together by three pillars 72, 73 and 74. If now a force is applied at point P which is to the top end 75 of pillar 73 then the central pillar 73 will deflect with respect to the outer two pillars 72 and 74. The shape of the spring elements 70 and 71 is indicated in FIG. 7a although any balanced cantilever configuration will do. Attached to the central pillar 73 is an electrode 76 with two guard electrodes 77 and 78 at either end. Attached to the outer pillars are two electrodes 79 and 80 which are adjacent to electrode 76. It will be appreciated that electrodes 76, 79 and 80 form a differential capacitor and thereby constitute a means for measuring a deflection of the pillar 73 with respect to pillars 72 and 74.

I claim:

1. A load measuring transducer comprising:
   a deformable frame structure defined by a first inflexible member that is static, a second inflexible member that moves in response to the load and a pair of arms spanning the space between the fixed and moving members and articulated thereto by resilient articulation means, said inflexible members, arms and articulation means being formed in one piece and defining a parallelogram linkage that deforms in response to linear load applied to the moving member;
   a capacitive transducer formed with spaced plates and having a static portion secured to the fixed member and a movable element secured to the moving member;
   a reference capacitor defined by spaced plates in the same dielectric medium as the capacitive transducer; and
   a differential or ratio measuring circuit that is connected to the capacitive transducer and the reference capacitor and gives an output signal denoting the magnitude of the load independent of temperature, humidity and other environmental conditions, said ratio measuring circuit further comprising a temperature sensitive resistance operable to compensate for the temperature variation in the spring rate of the resilient articulation means.

2. A transducer according to claim 1, wherein the deformable frame structure encloses within it the plates of the capacitive transducer and those of the reference capacitor.

3. A transducer according to claim 1, wherein electrodes of both said capactive transducer and said reference capacitor are connected to said moving member whereby said capacitive transducer and said reference capacitor act as a differential capacitor.

4. A transducer according to claim 1, wherein the capacitive transducer and the reference capacitor are defined by a cylindrical capacitor one of whose electrodes is interrupted to define static portions of a differential capacitor and the other of whose electrodes constitute said movable element.

5. A load measuring transducer comprising:
   a deformable frame structure defined by a first inflexible member that is static, a second inflexible member that moves in response to a load being measured, and a pair of arms spanning the space between the static and moving members and articulated thereto by resilient articulation means, a first element connected to and extending from said static member toward said moving member, and a second element connected to and extending from said moving member toward said static member, said inflexible members, arms and articulation means being formed in one piece and defining a parallelogram linkage that deforms in response to a linear load applied to the moving member to effect movement of said first and second elements relative to one another,
   a capacitive transducer mounted on said first and second elements and defining first and second capacitances in the same dielectric medium, said transducer comprising a first cylindrical electrode attached to one of said elements, second and third cylindrical electrodes attached to the other of said elements and disposed in fixed relation to one another, all of said cylindrical electrodes being coaxial with and spaced from one another, and the diameters of said second and third cylindrical electrodes being different from the diameter of said first cylindrical electrode, said first capacitance being defined between said first and second electrodes and said second capacitance being defined between said first and third electrodes, movement of said moving member and the element connected thereto upon application of a load to said moving member being operative to vary the capacitance of at least one of said first and second capacitances, and
   a measuring circuit connected to said first and second capacitances of said capacitive transducer, said measuring circuit being operative to provide an output signal denoting the magnitude of the applied load.

6. The load measuring transducer of claim 5 wherein said second and third cylindrical electrodes have substantially the same diameter and are axially spaced from one another.

7. The load measuring transducer of claim 6 wherein said first cylindrical electrode is attached to the element which extends from said moving member, and said second and third cylindrical electrodes are attached to the element which extends from said static member.

8. The load measuring circuit of claim 7 wherein said first electrode has a smaller diameter than, and is located within, said second and third electrodes.

9. The load measuring transducer of claim 7 including a pair of grounded guard rings disposed adjacent to and spaced from the opposing ends respectively of said first cylindrical electrode for movement with said first electrode upon movement of said moving member and the element connected thereto.

* * * * *